United States Patent
Liessmann et al.

(10) Patent No.: US 10,648,474 B2
(45) Date of Patent: May 12, 2020

(54) DEVICE AND METHOD FOR DRIVING A VACUUM PUMP

(71) Applicant: Leybold GmbH, Köln (DE)

(72) Inventors: Markus Liessmann, Dormagen (DE); Sebastian Walzel, Unna (DE)

(73) Assignee: Leyold GmbH, Cologne (DE)

( * ) Notice: Subject to any disclaimer, the term of this patent is extended or adjusted under 35 U.S.C. 154(b) by 0 days.

(21) Appl. No.: 16/307,696

(22) PCT Filed: Jun. 2, 2017

(86) PCT No.: PCT/EP2017/063528
§ 371 (c)(1),
(2) Date: Dec. 6, 2018

(87) PCT Pub. No.: WO2017/211735
PCT Pub. Date: Dec. 14, 2017

(65) Prior Publication Data
US 2019/0301469 A1    Oct. 3, 2019

(30) Foreign Application Priority Data
Jun. 7, 2016 (DE) .................. 10 2016 209 983

(51) Int. Cl.
F04D 13/06 (2006.01)
H02P 27/04 (2016.01)
F04D 19/04 (2006.01)
F04D 25/06 (2006.01)

(52) U.S. Cl.
CPC ......... *F04D 13/0693* (2013.01); *F04D 19/04* (2013.01); *F04D 25/068* (2013.01); *F04D 25/0693* (2013.01); *H02P 27/047* (2013.01)

(58) Field of Classification Search
CPC .... F04D 13/0693; F04D 19/04; F04D 25/068; F04D 25/0693; H02P 27/047
See application file for complete search history.

(56) References Cited

U.S. PATENT DOCUMENTS 8,476,854 B2    7/2013 Blöcher et al.

FOREIGN PATENT DOCUMENTS

| CN | 101950981 A | 1/2011 | |
|---|---|---|---|
| DE | 19522873 A1 | 1/1997 | |
| DE | 69505546 T2 | 8/1999 | |
| DE | 102008022618 A1 | 12/2009 | |
| DE | 102012212318 A1 * | 1/2014 | ............ H02P 27/085 |
| EP | 0597365 A1 | 5/1994 | |
| EP | 2961021 A1 | 12/2015 | |
| JP | 2001231268 A | 8/2001 | |
| WO | 200190835 A1 | 11/2001 | |

OTHER PUBLICATIONS

International Search Report dated Aug. 11, 2017 for PCT application No. PCT/EP2017/063528.

* cited by examiner

*Primary Examiner* — Daniel J Cavallari
(74) *Attorney, Agent, or Firm* — Ohlandt, Greeley, Ruggiero & Perle, LLP

(57) ABSTRACT

A vacuum pump drive having an electric motor and a frequency converterelectrically connected to the electric motor and arranged at a distance to the motor, wherein in the electric feed line from the frequency converter to the electric motor a transformer in the form of a transmitter of ferrite or sinter material is arranged.

15 Claims, 1 Drawing Sheet

DEVICE AND METHOD FOR DRIVING A VACUUM PUMP

BACKGROUND

1. Field of the Disclosure

The disclosure relates to an apparatus and a method for driving a vacuum pump.

2. Discussion of the Background Art

It is common practice to drive vacuum pump using an electric motor which is supplied with an alternating voltage from a frequency converter via an electric feed line. The frequency converter generates a voltage of variable frequency and/or amplitude for operating the electric motor independently of the frequency and/or amplitude.

Such a frequency converter—also referred to as a drive converter—generates a one- or multi-phase voltage which is variable with regard to voltage and frequency.

Usually, such converters are either supplied with an alternating voltage of 230 V or 400 V, for example, or with a direct voltage of 24 V or 48, for example from voltage supply mains. In the case of supply with an alternating voltage, the latter is rectified and fed to a direct-voltage intermediate circuit of the drive converter. In the case of supply with a direct voltage, the intermediate circuit is directly supplied with the direct voltage. The direct voltage in the intermediate circuit is then converted into a synthetic one- or multi-phase alternating voltage having a variable voltage amplitude and/or frequency and used for supplying the electric motor which drives the vacuum pump. The intermediate circuit voltage and the rated voltage of the electric motor usually have a ratio of approximately 1.5 to 1.

Some vacuum pumps, such as those subjected to a radioactive environment, high temperatures, explosive environments or used in large accelerator plants, for example, must be placed at large distances of 1000 m, for example, from the drive converter since the drive converter is not suitable for operating in radioactive, hot or explosive environments, for example.

At the same time, the pumps must be supplied with a small voltage for reasons of isolation strength (Paschen law), explosion protection and for reason of safety. For example, turbomolecular pumps (TMP) are supplied with 24 V or 48 V.

These small supply voltages necessitate relatively high currents which, in turn, in the case of long feed lines result in increased losses which have to be compensated for. In addition, the feed lines for high currents have a large self-capacitance whose charge must be constantly transferred during operation of the motor. This further increases the value of the currents in the long feed line.

It is an object of the disclosure to reduce the line losses in a vacuum pump drive with a frequency converter arranged at a distance to an electric motor.

SUMMARY

The disclosure is based on the fundamental idea of providing a transformer in the form of a transmitter of ferrite or sinter material in the electric feed line from the frequency converter to the electric motor of the vacuum pump drive for transforming the voltage for supplying the motor provided by the drive converter to a different voltage level from 400 V to 48 V, for example.

This interconnection allows for employing a drive converter for supplying the drive motor of a vacuum pump, which drive converter has a considerably higher intermediate circuit voltage and thus motor output voltage relative to the motor voltage (e.g. approximately 200 V or 400 V).

A reverse transformation and thus the employment of a drive converter having a considerably smaller intermediate circuit voltage relative to the rated motor voltage are possible. Thus high rotating field frequencies at relatively high rated motor voltages can be generated, for example.

The transformer may be a one-phase or a multi-phase transformer, wherein in the case of multi-phase systems a plurality of one-phase transformers can be employed. Further, the series-interconnection of a plurality of transformers for stepwise adjustment is possible.

The disclosure proposes employment of a converter for supplying the vacuum pump, which converter has an output voltage considerably higher than the motor voltage, for example a standard converter with 230 V or 400 V mains supply.

In this case, a transformer would be installed between the converter and the vacuum pump in the immediate vicinity of the pump. This transformer transforms the voltage of 230 V or 400 V, for example, to the level required for the motor, e.g. 48 V. At the major portion of the motor line a higher voltage and a smaller current would be present, which, in turn, leads to smaller losses in the feed line. At the same time, the feed line leading to the transformer can be made thinner and thus have a lower capacitance.

The transformer may be completely encapsulated or potted such that there is no risk of contamination or voltage flashover. Moreover, transformers are insusceptible to temperatures or radioactive radiation.

BRIEF DESCRIPTION OF THE DRAWINGS

Hereunder exemplary embodiments of the disclosure are explained in detail with reference to the drawings in which.

DETAILED DESCRIPTION OF THE PREFERRED EMBODIMENT

Figure 1:
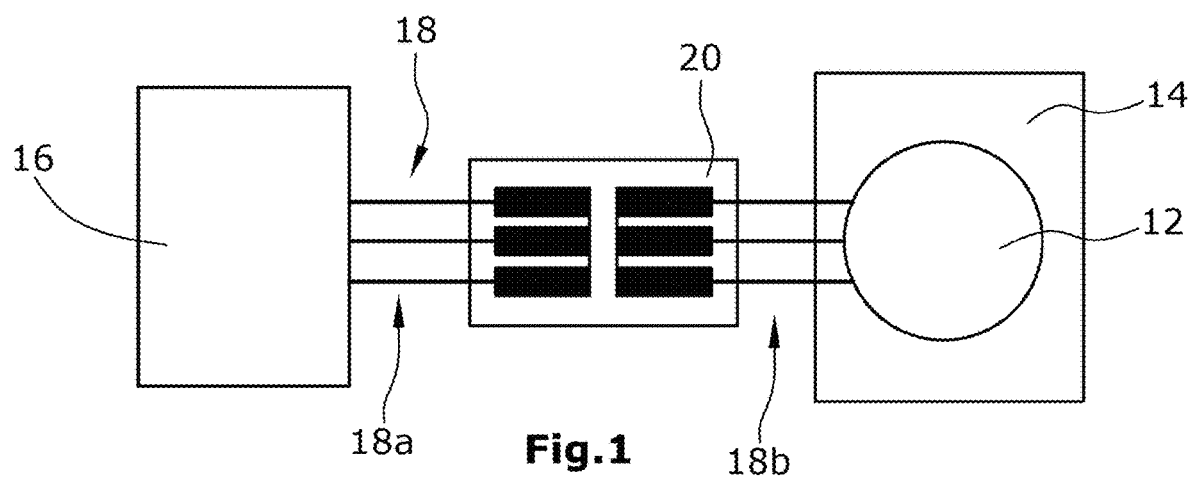
FIG. 1 shows a first exemplary embodiment.

In all three illustrated exemplary embodiments an electric motor 12 for driving a vacuum pump 14 is provided. The electric motor 12 is supplied with an electrical voltage of variable frequency and amplitude from a frequency converter 16 via an electric feed line 18. The torque of the electric motor 12 is generated, depending on the amplitude and the frequency, via the frequency converter 16.

The frequency converter 16 is arranged at a distance of at least 800 m and preferably 1 km from the electric drive motor 12 and the vacuum pump 14 due to safety requirements. For reducing the electrical losses during the transmission of the drive voltage in the long electric feed line 18, an electric transformer 20 in the form of a transmitter of ferrite or sinter material is provided in the feed line 18. A first section 18a of the electric feed line 18 is the feed line section between the frequency converter 16 and the transformer 20. A second fine section 18b of the electric feed line 18 is the feed line section between the transformer 20 and the electric motor 12. It is common to all three exemplary embodiments that the first feed line section 18a is considerably longer that the feed line section 18b. While the feed line section 18b has a length of only a few meters, the feed line section 18a is several hundreds of meters long.

The frequency converter 16 and the transformer 20 are configured to transmit a voltage of several hundreds of volts, 400 V for example, via the first feed line section 18a, while a voltage of only a few tens of volts, 48 V for example, is transmitted via the feed line section 18b. When the 48 V alternating voltage of the second feed line section 18b is used, the safety requirements for radioactive environment, high temperatures, explosive environments or large accelerating plants, for example, are complied with, while the line losses during the transmission from the frequency converter to the electric motor 12 are reduced by the first feed line section 18a, which is as long as possible, transmitting a considerably higher alternating voltage at considerably smaller losses.

The cross-section of the lines used for the first feed line 18a is smaller than the cross-section of the lines used for the second feed line 18b and amounts to a maximum of 1.5 mm². The capacitance of the lines used for the first feed fine section 18a is also smaller than the capacitance of the lines used for the second feed line section 18b and amounts to less than approximately 100 pF/m.

Thus, while via the first feed line section 18a a high voltage and a small current are transmitted over a long line through a thin cable having a low capacitance and low losses, a high current and a small voltage are transmitted via a short feed line section 18b.

The essential advantage of the disclosure is that, depending on the position of the transformer 20 inside the feed line 18, the current load of a major portion of the motor feed line 18 is considerably reduced. Thus the line losses are substantially minimized. At the same time, the electrically conductive cross-section of the feed line 18 can be considerably reduced. Thus costs are saved and at the same time the electrical capacitance of the feed line and thus the charge-transfer currents or reactive currents in the drive converter 16 are reduced.

In the exemplary embodiment of FIG. 1 a three-phase transformer is operated inside a three-phase feed line 18.

Figure 2:
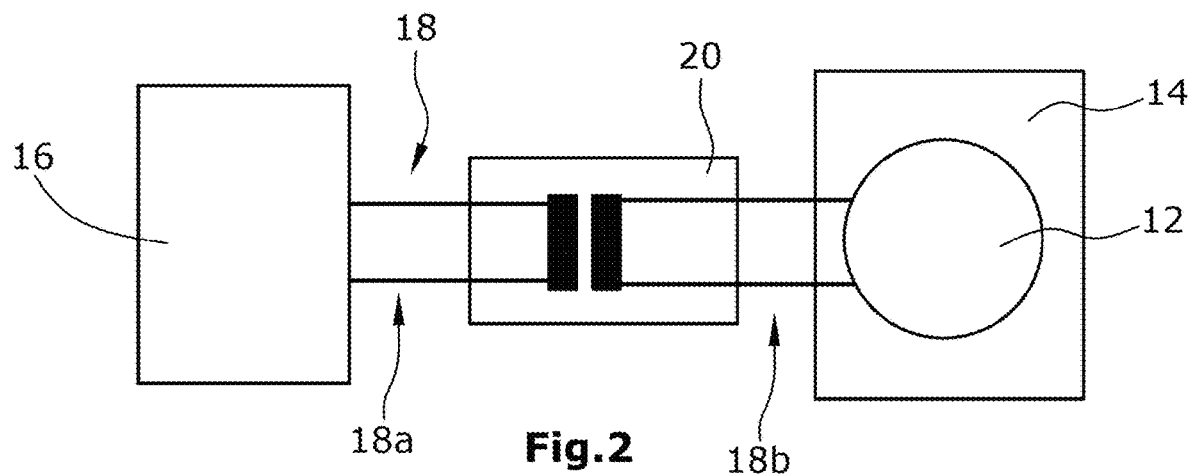
FIG. 2 shows a second exemplary embodiment.

In the exemplary embodiment of FIG. 2 a two-phase transformer is operated in a two-phase feed line 18.

Figure 3:
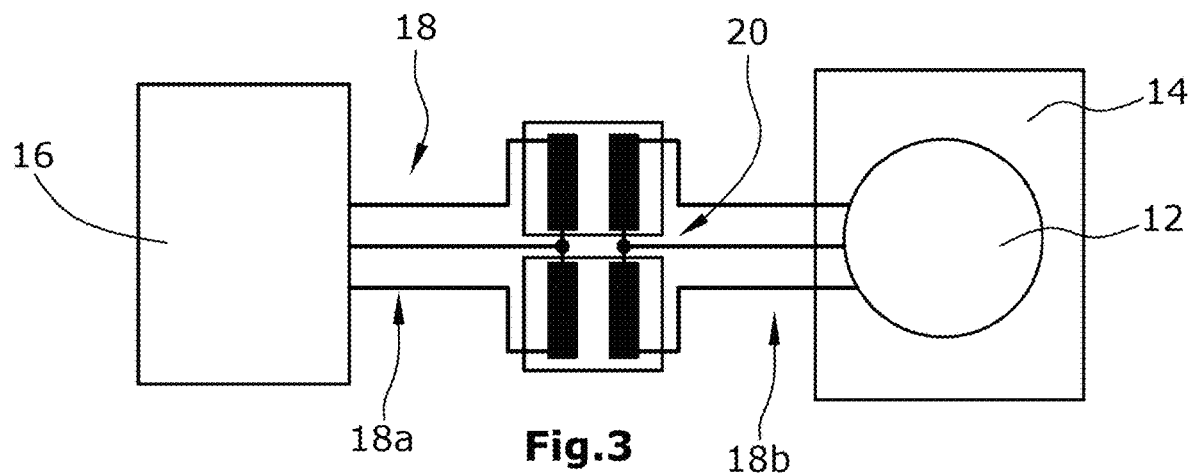
FIG. 3 shows a third exemplary embodiment.

In the exemplary embodiment of FIG. 3 two parallel connected two-phase transformers 20 are operated in a three-phase feed line 18.

What is claimed is:

1. A vacuum pump drive having an electric motor and a frequency converter electrically connected to said electric motor and arranged at a distance to said motor, wherein
in the electric feed line from said frequency converter to said electric motor a transformer in the form of a transmitter of ferrite or sinter material is arranged.

2. The vacuum pump drive according to claim 1, wherein a first section of the electric feed line between the frequency converter and the transformer is made considerably longer than a second section of said electric feed line between said transformer and the electric motor.

3. The vacuum pump drive according to claim 2, wherein the first section is at least twice as long as a second section of the electric feed line between the transformer and the electric motor.

4. The vacuum pump drive according to claim 2, wherein the frequency converter and the transformer are configured for transmitting a first voltage via the first feed line section, which is larger than the voltage transmitted via the second feed line section between said transformer and the electric motor.

5. The vacuum pump drive according to claim 4, wherein the first voltage is at least twice as large as the voltage transmitted via the second feed line section between the transformer and the electric motor.

6. The vacuum pump drive according to claim 1, wherein the frequency converter is arranged at a distance of at least 100 m from the electric motor.

7. The vacuum pump drive according to claim 6, wherein the transformer is arranged closer to the electric motor than to the frequency converter.

8. The vacuum pump drive according to claim 1, wherein the electric cables of the first feed line section between the frequency converter and the transformer have a small cross-section of approximately 1.5 mm².

9. The vacuum pump drive according to claim 1, wherein the cables of the first feed line section between the frequency converter and the transformer have a capacitance of less than approximately 100 pF/m.

10. The vacuum pump drive according to claim 1, wherein the cables of the first feed line section between the frequency converter and the transformer are made thinner and with a smaller capacitance than the cables of the second feed line section between said transformer and the electric motor.

11. A method for driving a vacuum pump having a vacuum pump drive according to claim 1, wherein via the first feed line section between a frequency converter and a transformer a higher voltage and a smaller current are transmitted than via the second feed line section between said transformer and an electric motor.

12. The method according to claim 11, wherein the voltage of the first feed line section is at least five times and preferably at least eight times as large as the voltage of the second feed line section.

13. The vacuum pump drive according to claim 3, wherein the first section is approximately ten times as long as a second section of the electric feed line between the transformer and the electric motor.

14. The vacuum pump drive according to claim 5, wherein the first voltage is at least eight times as large as the voltage transmitted via the second feed line section between the transformer and the electric motor.

15. The vacuum pump drive according to claim 6, wherein the frequency converter is arranged at a distance of at least 500 m from the electric motor.

* * * * *